Dec. 26, 1967     D. J. BARR     3,360,099
CONVEYING EQUIPMENT
Filed March 10, 1966     2 Sheets-Sheet 1
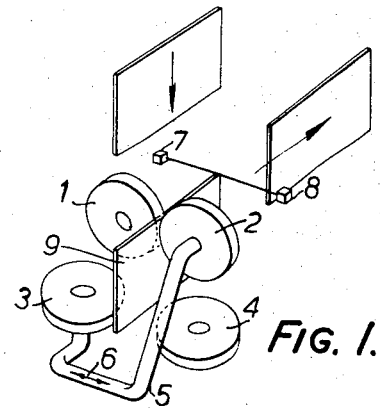
FIG. 1.
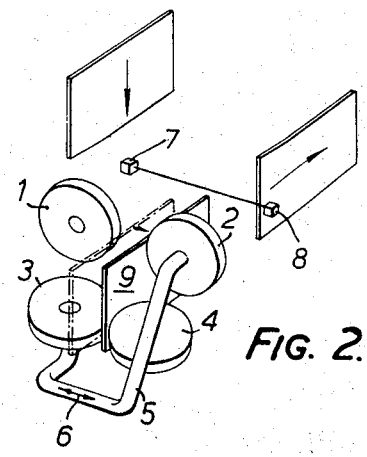
FIG. 2.
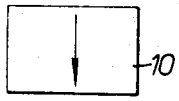
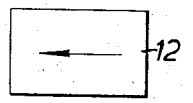  
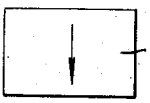
FIG. 3.
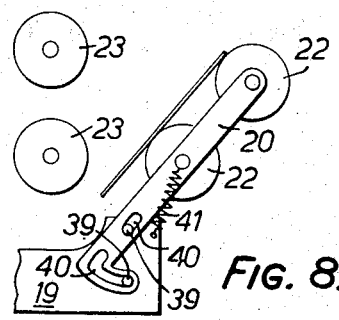
FIG. 7.     FIG. 8.
DAVID J. BARR,
INVENTOR
BY Hall & Houghton
ATTORNEY Dec. 26, 1967  D. J. BARR  3,360,099
CONVEYING EQUIPMENT
Filed March 10, 1966  2 Sheets-Sheet 2

DAVID J. BARR,
INVENTOR

BY
ATTORNEY

United States Patent Office 3,360,099
Patented Dec. 26, 1967

3,360,099
CONVEYING EQUIPMENT
David John Barr, Harrow Weald, England, assignor to Her Majesty's Postmaster General, London, England
Filed Mar. 10, 1966, Ser. No. 533,193
Claims priority, application Great Britain, Mar. 16, 1965, 11,170/65
7 Claims. (Cl. 198—21)

ABSTRACT OF THE DISCLOSURE

Transferring equipment for flat postal items, the equipment having a first set of rollers for conveying an item in a first direction into a predetermined position and a second set of rollers for conveying the item from the predetermined position in a second direction different from the first direction, the change in direction of motion of the item occurring without alteration of the orientation of the item relative to the first direction of motion and without mis-shaping of the item in any way during the turning process. Part of the first set of rollers and part of the second set of rollers are on a common movable carriage.

---

This invention relates to transferring equipment for changing the direction of movement of articles and has particular reference to conveying equipment for flat articles, for example, postal items such as letters and post cards, checks, sheets and forms.

In such equipment it is sometimes required to change the orientation of a flat article relative to its direction of motion. Change of orientation may be effected either by maintaining unchanged the direction of motion of the article and turning the latter or by changing the direction of motion relative to the article. Apparatus employing the first-mentioned method must either bring the article to a standstill prior to turning it or attempt to turn the article whilst it is moving. In the first case, unacceptable time delays may be involved, whilst in the second case, turns approximating to 90° are difficult to achieve and the article may be marked or sometimes damaged due to a scuffing action of the driving wheels which turn the article.

It is an object of the present invention to provide transferring equipment able to effect a re-orientation of a flat article relative to the direction in which the article is moving without being subject to the disadvantages mentioned above.

According to the present invention, transferring equipment for changing the direction of movement of flat postal articles comprises in combination a first conveyor for moving the articles in turn in a first direction to a predetermined location in a predetermined orientation, first conveyor control means adapted to cause said first conveyor to terminate movement of each article in turn in said predetermined location, a second conveyor for moving each article in turn from the predetermined location in a second direction different from the first direction without changing the orientation of the articles, and first to second conveyor linking means adapted to commence movement of an article by the second conveyor from the predetermined location not earlier than termination of the movement of said article by the first conveyor.

Termination of the moving effort of the second mechanism may occur on resumption of the moving effort of the first mechanism.

Both conveyors may comprise two parts between which the article is moved, the linking means including means for bringing together and separating the two parts to move and terminate movement of the article respectively.

In one embodiment of the invention, one part of each conveyor is mounted upon a movable carriage included in the linking means to effect the bringing together and separation of the parts.

The first and second conveyors may comprise pairs of rollers arranged in such manner that the articles pass between the rollers of each pair. In this case, the parts of the conveyors comprise one roller from each pair of rollers of the mechanism. Rollers not mounted upon a carriage are driven to rotate about their axes and the driving means may include clutch and brake units for connecting and disconnecting a roller from the driving means and for braking the roller whilst disconnected.

The first conveyor control means may be responsive to movement of an article into the predetermined location and may co-operate with the conveyor linking means, when the article moves into that location, to terminate movement of the first article by the first conveyor and to initiate movement of the article by the second conveyor. The means may comprise a radiation emitter and detector so arranged that the article, in passing to the predetermined location prevents reception by the detector of radiation emitted by the emitter.

The movable carriage may be mounted for movement upon a framework provided with means for guiding the carriage during movement.

Where the first and second mechanisms are in two parts, one of the parts may be carried by a pivotally mounted arm which is displaceable from its normal position to permit removal of an article in the predetermined location.

The pivotally mounted arm may be part of the carriage referred to above and where the mechanisms are rollers, the arm carries the non-driven rollers. The carriage may be mounted upon links pivotally attached to the framework.

By way of example only, an embodiment of the invention suitable for use in postal machinery and designed to handle postal items for example, letters and post cards, will now be described in greater detail with reference to the accompanying drawings of which:

FIGS. 1 and 2 are schematic drawings showing the basic essentials of the embodiment, FIG. 3 is a block schematic illustrating direction changes.

FIGS. 7 and 8 are scrap views showing a modification of the embodiment in different positions.

Figures 4, 5:
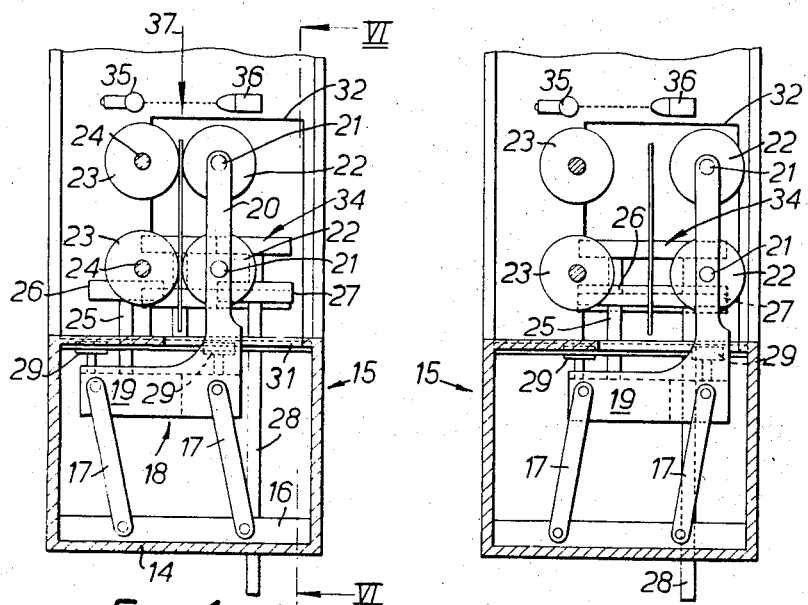
FIGS. 4 and 5 are sections on the line IV—IV of FIG. 6 showing the embodiment in different operating positions.

FIGS. 1 and 2 reveal the basic essentials of the embodiment and show a first conveying mechanism comprising a pair of driving rollers 1, 2 and a second conveying mechanism comprising a pair of driving rollers 3, 4. The axes of rotation of the rollers 1, 2 are parallel and at right angles to the parallel axes of rotation of the rollers 3, 4. Rollers 2 and 3 are rotatably mounted in a framework shown in the drawings as a single member 5 which is movable to and fro as indicated by arrow 6 by means not shown but which are controlled by a circuit including a light source 7 and a photo-electric cell 8. FIGS. 1 and 2 do not show any roller driving mechanism but it will be understood that rollers 1 and 4 are connected via suitable braking and clutch mechanisms to separate driving sources or a common driving source. Rollers 2 and 3 may also be driven but are more likely to be idlers.

In operation, postal items to be re-orientated are fed via other driving rollers (not shown) to the nip of rollers 1, 2 which, being in the position shown in FIG. 1, feed the item to position 9. When the item reaches that position, i.e. a predetermined time after its lower edge breaks the beam of light from the source 7 to photo-electric cell 8, roller 1 is brought to a standstill by declutching and braking, the member 5 moves so that roller 3 disengages the item from roller 1 and engages it with roller 4 which is then driven to propel the letter in a direction at right angles to its previous direction of movement. This is shown in FIG. 2. As the item clears rollers 3, 4 it is engaged by other propulsion elements (not shown) and at the same time, the member 5 returns to the position shown in FIG. 1 in readiness to receive another item.

In an alternative construction, roller 4 is driven continuously so that the item is propelled in the new direction as soon as it is engaged by the roller.

Figure 6:
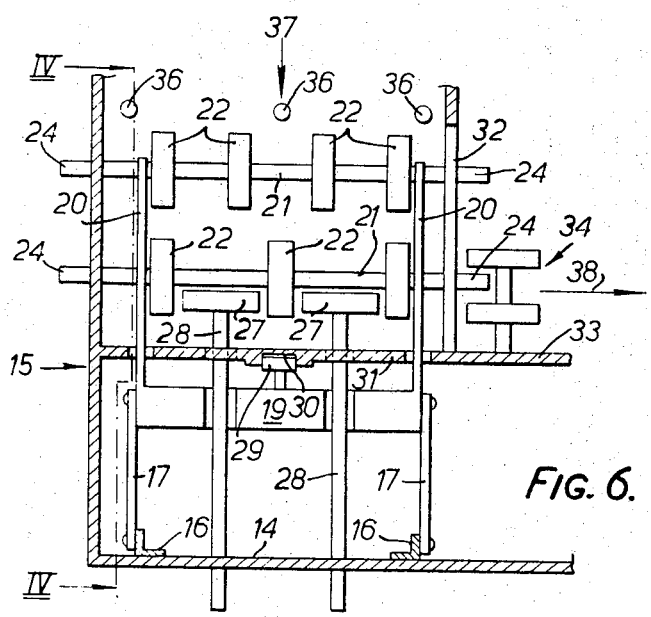
FIG. 6 is a section on the line VI—VI of FIG. 4.

It will normally be necessary to provide several light sources 7 and co-operating photo-electric cells 8 since the letter being fed to position 9 may be misaligned. The several sources and cells will be disposed in a plane normal to the direction of travel of the item when moving to position 9 and are seen in FIG. 6.

Some variation of the time of drive out by rollers 3, 4 will occur with items of different thickness, but this is small compared with the variation which takes place due to the range of item sizes which the embodiment will be required to handle in practice. It will be clear that interruption of the light beam by the item determines the start of the cycle described above.

A further alternative arrangement is to dispense with all clutch-brake units and to have rollers 1 and 4 rotating continuously. Functionally, that arrangement is satisfactory but variation of thickness of the items results in variation of both the time of feed-out and the position of feed-out. The latter variations can be accommodated by suitable design of the machine of which the embodiment is a part.

The photo-electric cell control described above can be omitted and the member 5 moved under some other stimulus. Movement might be synchronized with some other event, for example.

If the photo-electric cell control is omitted, the embodiment can be operated as a diverter and only selected items diverted by the rollers 3, 4. FIG. 3 shows this in block schematic form. An item 10 when in position 9 can, by means of suitable control mechanism, be allowed to pass through as indicated at 11 or be diverted to left or to right as indicated at 12 and 13 respectively.

The embodiment is shown in a more practical form in FIGS. 4, 5 and 6. The floor 14 (FIG. 6) of a framework 15 carries brackets 16 to which are pivotally secured links 17 which extend in a generally upward direction from the floor 14 and support a carriage 18 having a base portion 19 to which the links 17 are pivotally secured and upwardly extending links 20 between which horizontal axles 21 are mounted. Rotatably mounted upon axles 21 are free running rollers 22 co-operating with which are further rollers 23 mounted upon axles 24 and connected via a clutch and brake mechanism (not shown) to drive shafts (also not shown). The axles 24 are mounted on brackets (not shown) fixed to the main framework 15.

The carriage 18 also carries vertical axles 25 upon which freely running rollers 26 are rotatably mounted. Co-operating with rollers 26 are further rollers 27 mounted upon shafts 28 journalled in the framework 15 which are connected via clutch and brake mechanisms (not shown) to drive shafts (also not shown).

The parallel links 17 constrain the carriage to move in an arc between the position shown in FIG. 4 in which rollers 22 and 23 are closely adjacent whilst rollers 26 and 27 are separated, and that shown in FIG. 5 in which rollers 22 and 23 are separated whilst rollers 26 and 27 are closely adjacent. The extent of movement of the carriage is relatively small and can be considered to be in a straight line. Complete stability of movement of the carriage is achieved by means of guide wheels 29 rotatably mounted in the portion 19 of carriage 18 and movable in a guide slot 30 in the undersurface of a member 31 forming part of the framework 15. That framework is apertured as at 32 to permit sideways movement of items, as will be described later, on to a member 33. Sideways movement is effected by additional propelling rollers of which one set 34 is shown in FIG. 6.

Mounted above the upper ones of the rollers 22, 23 is a row of light sources 35 each with its individual photo-electric cell 36. The sources lie on a line parallel to the axles 21, 24. The photo-electric cells are connected in the control circuit of the embodiment as will be apparent from the subsequent description.

In operation, with the parts in the position shown in FIG. 4, postal items approach the embodiment in the direction indicated by arrow 37 and enter the nip of the upper ones of rollers 22, 23. A predetermined time after the leading edge of the item interrupts one or more of the light beams, the drive to rollers 23 is declutched, the brake applied and the carriage 18 is moved by a means such as a solenoid (not shown) to the position shown in FIG. 5. Movement of the item in the direction of arrow 37 ceases and the item comes momentarily to rest. Rollers 26 and 27 engage the item, the clutch is operated to drive rollers 27 and the item is propelled to the right as viewed in FIG. 6 and indicated by arrow 38. The carriage then restores to the position shown in FIG. 4 in readiness for the next item.

If desired, rollers 27 may be driven continuously so that the item is driven out as soon as it is engaged by these rollers. The clutch and brake in the drive to roller 23 may also be omitted.

FIGS. 7 and 8 show an alternative construction of the carriage 18. Limbs 20 are separate from the base portion 19 to which they are attached by means of pins 39 which are entered in slots 40 in the limbs 20. The lower (as viewed in FIGS. 7 and 8) of the slots has an arc-shaped portion, thereby permitting the limbs to be lifted upwardly against springs 41 and swung outwardly from the position shown in FIG. 7 to that shown in FIG. 8. The action enables an item jammed in the turn position to be cleared. Jamming might occur due to malfunctioning of the photo-electric cells for example.

The design of the embodiment of FIGS. 4, 5 and 6 is such that the items exit from the 90° turn displaced from the entry path. In this case with a total carriage movement of ¾" the displacement is ⅜". Theoretically if an item is infinitely thin and straight all inactive rollers would have a ⅜" clearance from the item. In practice the item has thickness and will often be curved in some manner so that some of the ⅜" clearance provided will be used.

The rollers used throughout may be of the type described in the specification of co-pending British application No. 34,782/63 and may have a serrated surface, comparable to a spur gear wheel of small tooth size. They run together with a fairly positive grip so that only one roller of each pair needs to be driven. This enables all drives to the shafts of rollers on the carriage to be avoided and only those shafts not supported or moved with the carriage are driven.

In practice, the construction of the embodiments is particularly favourable to careful handling of mail items, a very desirable feature, and the accuracy of the 90° turn is such that supplementary means, after the turn, to correct inaccuracies are unnecessary.

The layout of postal machinery can be improved and overall machine dimensions reduced considerably by employing 90° turns. By using two 90° turns sequentially, it becomes possible to turn an item 180° relative to the stream. This could be useful in letter facing machines where letters have to be orientated with the stamp in a certain corner. The 180° turn could reduce the numbers of stacking boxes and stamp cancellation facilities commonly used.

I claim:
1. Transferring equipment for changing the direction of movement of flat postal articles comprising in combination a first conveyor for moving the articles in turn in a first direction to a predetermined location in a predetermined orientation, first conveyor control means adapted to cause said first conveyor to terminate movement of each article in turn in said predetermined location, a second conveyor for moving each article in turn from the predetermined location in a second direction different from the first direction without changing the orientation of the articles, and first to second conveyor linking means adapted to commence movement of an article by the second conveyor from the predetermined location not earlier than termination of the movement of said article by the first conveyor, wherein each conveyor comprises two parts between which the article is moved, the linking means including means for bringing together and separating the two parts to move and terminate movement of the article respectively, and the linking means include a movable carriage upon which one part of each conveyor is mounted.

2. Equipment as claimed in claim 1 in which the first and second conveyors comprise pairs of rollers arranged to pass the articles between the rollers of each pair.

3. Equipment as claimed in claim 2 in which one roller from each pair of rollers is driven to rotate about its axis, the other roller of each pair of rollers being mounted upon the movable carriage.

4. Equipment as claimed in claim 1 and further including an arm pivotally mounted on the movable carriage, the arm carrying one roller of each of the pairs of rollers of the first conveyor and being displaceable from its normal position to permit removal of an article when in the predetermined position.

5. Equipment as claimed in claim 1 and further including a framework on which the movable carriage is mounted for movement thereon, and guiding means on said framework, said means guiding the movable carriage on the framework during movement of the carriage.

6. Equipment as claimed in claim 5 and further including links pivotally attached to the framework, the movable carriage being pivotally mounted on the links.

7. Equipment as claimed in claim 1 and further including a pivotally mounted arm, said arm carrying one of the parts of the first conveyor and being displaceable from its normal position to permit removal of an article when in the predetermined location.

References Cited

UNITED STATES PATENTS

| | | | |
|---|---|---|---|
| 2,703,169 | 3/1955 | Beyer. | |
| 2,714,440 | 8/1955 | Forty et al. | |
| 2,984,349 | 5/1961 | Mathis. | |
| 3,108,677 | 10/1963 | Temple | 198—21 |
| 3,241,664 | 3/1966 | Maul | 209—110 X |

RICHARD E. AEGERTER, *Primary Examiner.*

EVON C. BLUNK, *Examiner.*

M. L. AJEMAN, *Assistant Examiner.*